United States Patent
Duff (10) Patent No.: US 10,202,268 B2
(45) Date of Patent: Feb. 12, 2019

(54) ALIGNER CHAIR, SUPPORT SYSTEM INCLUDING THE ALIGNER CHAIR AND METHOD FOR SUSPENDING THE ALIGNER CHAIR FROM A LIFT

(71) Applicant: Honda Motor Co., Ltd., Minato-ku, Tokyo (JP)

(72) Inventor: Douglas J. Duff, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 14/803,986

(22) Filed: Jul. 20, 2015

(65) Prior Publication Data

US 2017/0020293 A1 Jan. 26, 2017

(51) Int. Cl.
*B66F 11/04* (2006.01)

(52) U.S. Cl.
CPC .................. *B66F 11/044* (2013.01)

(58) Field of Classification Search
CPC .......... A61G 5/104; B62B 1/002; B66F 1/044
USPC ....................................................... 280/32.5
See application file for complete search history.

(56) References Cited

U.S. PATENT DOCUMENTS

| | | | |
|---|---|---|---|
| 2,788,193 A | 4/1957 | Sanders et al. | |
| 3,672,305 A | 6/1972 | Richins | |
| 4,555,138 A * | 11/1985 | Hughes | A47C 9/022 296/65.14 |
| 4,765,614 A * | 8/1988 | Shute | A61G 5/104 482/112 |
| 4,813,088 A * | 3/1989 | DiMatteo | A61G 5/104 5/81.1 C |
| 4,957,302 A * | 9/1990 | Maxwell | A47C 3/0257 280/32.6 |
| 5,161,640 A | 11/1992 | Holbrooks et al. | |
| 5,269,227 A * | 12/1993 | Warren | B66B 9/08 104/89 |
| 5,419,752 A * | 5/1995 | James | A61H 1/02 482/51 |
| 5,466,111 A * | 11/1995 | Meyer | A61G 5/1059 280/250.1 |
| 5,515,789 A * | 5/1996 | Brochand | B61B 12/04 104/173.1 |
| 5,524,952 A * | 6/1996 | Czech | B60N 2/245 296/65.12 |
| 5,547,259 A * | 8/1996 | Fredrick | B60N 2/682 297/284.1 |
| 5,632,521 A * | 5/1997 | Archambault | A61G 3/00 296/65.13 |
| 5,671,976 A * | 9/1997 | Fredrick | B60N 2/682 297/284.1 |

(Continued)

*Primary Examiner* — James A Shriver, II
*Assistant Examiner* — Vaughn Coolman
(74) *Attorney, Agent, or Firm* — Arent Fox LLP (57) ABSTRACT

A chair configured to movably couple to parallel guide rails of a frame includes a support bar having a first end and an opposing second end. A transverse cross-member is coupled to the first end of the support bar. The transverse cross-member has a first side portion and an opposing second side portion. A first support assembly is coupled to the first side portion of the transverse cross-member. The first support assembly is configured to removably couple to a first guide rail of the parallel guide rails. A second support assembly is coupled to the second side portion of the transverse cross-member. The second support assembly is configured to removably couple to a second guide rail of the parallel guide rails.

19 Claims, 10 Drawing Sheets

(56) References Cited

U.S. PATENT DOCUMENTS

| | | | |
|---|---|---|---|
| 5,769,480 A * | 6/1998 | Gebhardt | B60N 2/245 296/65.12 |
| 5,897,122 A | 4/1999 | Borner | |
| 6,015,256 A * | 1/2000 | Mesa | A61G 5/104 414/678 |
| 6,036,252 A * | 3/2000 | Hecksel | B60N 2/01583 296/63 |
| 6,224,154 B1 * | 5/2001 | Stoki | A61B 90/60 297/338 |
| 6,227,619 B1 * | 5/2001 | Pesta | B60N 2/01583 296/65.03 |
| 6,375,246 B1 * | 4/2002 | Nicola | B60N 2/01583 296/65.03 |
| 6,425,590 B1 | 7/2002 | Whiteside et al. | |
| 6,821,078 B2 * | 11/2004 | Dudai | A61G 5/045 296/65.04 |
| 6,824,149 B1 | 11/2004 | Whitlock et al. | |
| 6,883,457 B2 * | 4/2005 | Lipscombe | B60F 3/003 114/363 |
| 7,080,715 B1 | 7/2006 | Bowlin | |
| 7,111,335 B2 * | 9/2006 | Noro | A47K 3/006 4/555 |
| 7,112,022 B1 * | 9/2006 | McLoughlin | B60P 7/16 410/156 |
| 7,155,757 B1 * | 1/2007 | Zamora, Jr. | A61G 7/1003 4/579 |
| 7,686,310 B2 | 3/2010 | Perkins | |
| 7,802,852 B2 * | 9/2010 | Siegrist | B60N 2/686 297/452.18 |
| 7,914,384 B2 * | 3/2011 | Roodenburg | A63G 7/00 104/63 |
| 7,987,032 B2 * | 7/2011 | Uenuma | B60N 2/0232 296/65.13 |
| 8,146,713 B2 * | 4/2012 | Rosenthal | B66B 9/083 187/200 |
| 8,573,607 B2 | 11/2013 | Meacham et al. | |
| 8,616,604 B2 * | 12/2013 | Bourgraf | A61G 3/00 296/19 |
| 8,671,475 B2 * | 3/2014 | Radzinsky | A61G 3/061 5/628 |
| 8,757,578 B2 * | 6/2014 | Kitamura | B60N 2/07 248/430 |
| 8,814,273 B2 * | 8/2014 | Zekavica | B60N 2/68 297/378.1 |
| 8,960,340 B2 * | 2/2015 | Tallino | A61G 5/047 180/11 |
| 9,028,374 B1 * | 5/2015 | Brady | A63B 22/0076 482/72 |
| 9,315,135 B2 * | 4/2016 | Kitou | B60N 2/682 |
| 9,428,083 B2 * | 8/2016 | Lehner | B60N 2/502 |
| 9,440,571 B2 * | 9/2016 | Kitou | B60N 2/68 |
| 9,539,922 B2 * | 1/2017 | Mildner | B60N 2/4805 |
| 2004/0113481 A1 * | 6/2004 | Saberan | B60N 2/682 297/452.18 |
| 2006/0037789 A1 * | 2/2006 | Kritman | A61G 5/061 180/9.32 |
| 2007/0158969 A1 * | 7/2007 | Walkingshaw | A61G 3/00 296/64 |
| 2010/0045059 A1 * | 2/2010 | Bourgraf | B60P 1/003 296/19 |
| 2012/0275891 A1 * | 11/2012 | Pace | A61G 3/0209 414/549 |
| 2013/0011231 A1 * | 1/2013 | Tekulve | A61G 5/104 414/495 |
| 2014/0203537 A1 * | 7/2014 | Chiu | A61G 3/063 280/304 |
| 2014/0292018 A1 * | 10/2014 | Kinzer | B60N 2/01575 296/65.03 |
| 2015/0231005 A1 * | 8/2015 | Gray | A61G 5/14 5/86.1 |
| 2016/0074261 A1 * | 3/2016 | Schoenian | A61G 3/062 414/462 |

* cited by examiner

ALIGNER CHAIR, SUPPORT SYSTEM INCLUDING THE ALIGNER CHAIR AND METHOD FOR SUSPENDING THE ALIGNER CHAIR FROM A LIFT

BACKGROUND

The subject matter disclosed herein relates to a support system for suspending an aligner chair from a lift frame and, more particularly, to an aligner chair configured to movably couple to guide rails of the lift frame.

Using conventional methods to perform a wheel alignment, a mechanic crouches under a vehicle that is raised on a lift. In order to alleviate some of the discomfort in performing wheel alignments in this manner, a rolling chair has been utilized. However, when the vehicle is raised, the rolling chair may fall into troughs under the lift. To prevent the potential risk of the rolling chair falling into the trough, a safety rail may be positioned around the trough; however, such safety rail may present a trip hazard when no vehicle is on the lift.

SUMMARY

In one aspect, a chair configured to movably couple to parallel guide rails of a frame includes a support bar having a first end and an opposing second end. A transverse cross-member is coupled to the first end of the support bar. The transverse cross-member has a first side portion and an opposing second side portion. A first support assembly is coupled to the first side portion of the transverse cross-member. The first support assembly is configured to removably couple to a first guide rail of the parallel guide rails. A second support assembly is coupled to the second side portion of the transverse cross-member. The second support assembly is configured to removably couple to a second guide rail of the parallel guide rails.

In another aspect, a support system for suspending a user from a lift is provided. In one embodiment, the lift includes a frame having parallel guide rails extending along a length of the lift. The support system includes a chair operatively coupled to the guide rails. The chair is configured to move along the guide rails between a first end of the frame and a second end of the frame. A sensing system is operatively coupled to the lift and the chair. The sensing system includes one or more sensors configured to detect a chair full forward position, a chair transport configuration, and a chair home position. A controller is in signal communication with the sensing system. The controller is configured to control operation of the lift based at least in part on signal communication with the sensing system.

In yet another aspect, a method for suspending a chair from a lift is provided. In one embodiment, the lift includes a frame having parallel guide rails extending along a length of the lift. The method includes raising the lift from a lift home position to a first intermediary position corresponding to a chair transport configuration, with the chair in the chair transport configuration, positioning the chair with respect to the guide rails so that laterally opposing upper rollers of the chair are positioned above a top surface of the guide rails, raising the lift so that each of the laterally opposing upper rollers of the chair contact a top surface of a corresponding guide rail of the parallel guide rails to urge a bottom of the chair to move toward the lift, and raising the lift to an elevated position wherein laterally opposing lower rollers of the chair contact a bottom surface of the corresponding guide rail to support the chair suspended from the frame.

BRIEF DESCRIPTION OF THE DRAWINGS

Other aspects and advantages of certain embodiments will become apparent upon consideration of the following detailed description, wherein similar structures have similar reference numerals.

DETAILED DESCRIPTION

The embodiments described herein overcome difficulties associated with known vehicle assembly or maintenance processes performed under a vehicle by providing a portable aligner chair supported by lift guide rails that allows a user to perform work, such as a wheel alignment, while suspended from the lift. The aligner chair as disclosed herein is supported by the guide rails of the lift. Because the aligner chair is movably secured to the guide rails, the aligner chair will not fall into the trough under the lift. The user is able to position the aligner chair at the lowered lift and, as the lift is raised to raise the vehicle, the aligner chair is lifted into a suspended or elevated position. During use, the user sits in the aligner chair with the vehicle above the user and performs the wheel alignment. The aligner chair also includes wheels to allow the user to roll the aligner chair (instead of carry it) when the aligner chair is not coupled to the lift.

In one embodiment, the aligner chair includes a support frame, such as a support bar, having opposing side portions or arms extending laterally from the support bar and a base coupled to the support bar. A seat is coupled to the base. A support bracket is coupled to each side portion and includes a first or upper support roller and a second or lower support roller movably coupled to the respective guide rail of the lift to allow the aligner chair to move along a length of the guide rail. The base is rotatable with respect to the support bar in a first plane with the aligner chair supported on the lift. The vertical support bar is adjustable to a desired length. The aligner chair also includes wheels coupled to each side portion and at a bottom end of the support bar to allow the user to roll the aligner chair when not in use, rather than having to carry the aligner chair.

To couple the aligner chair to the lift, the aligner chair is aligned with the lift such that each upper support roller is positioned vertically above a first or top rolling surface of the respective guide rail. As the lift is raised, the aligner chair rotates with respect to the guide rails with the assistance of the wheel coupled to the bottom end of the support bar. As the aligner chair rotates with respect to the guide rails, each lower support roller contacts a second or bottom rolling surface of the respective guide rail. At a final height of the lift, the aligner chair is fully supported by the lift to suspend above the floor or support surface. In between use, the aligner chair can be removed from the lift.

Figure 4:
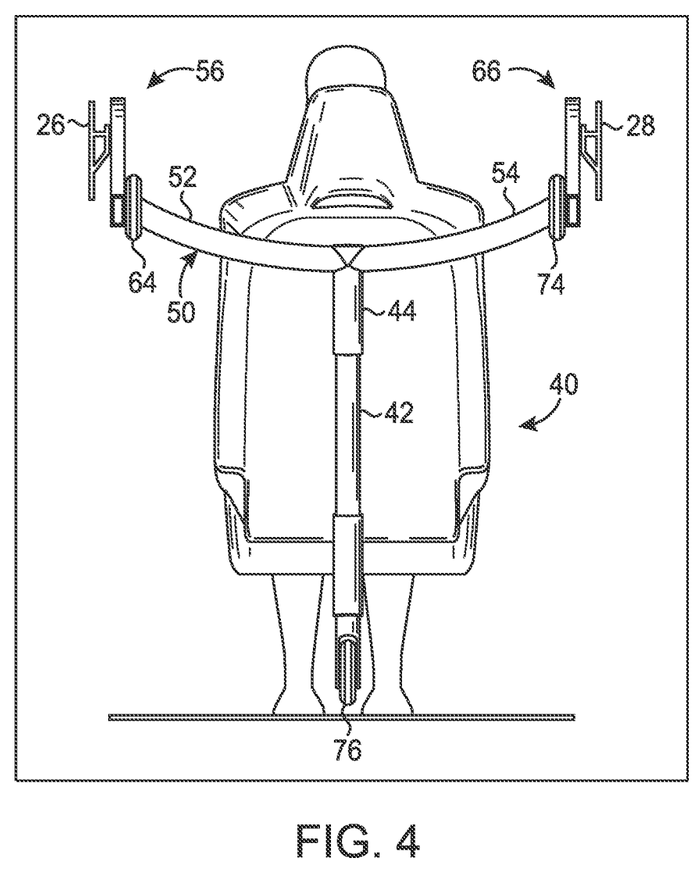
FIG. 4 is a back view of the exemplary system shown in FIG. 1.
Figure 5:
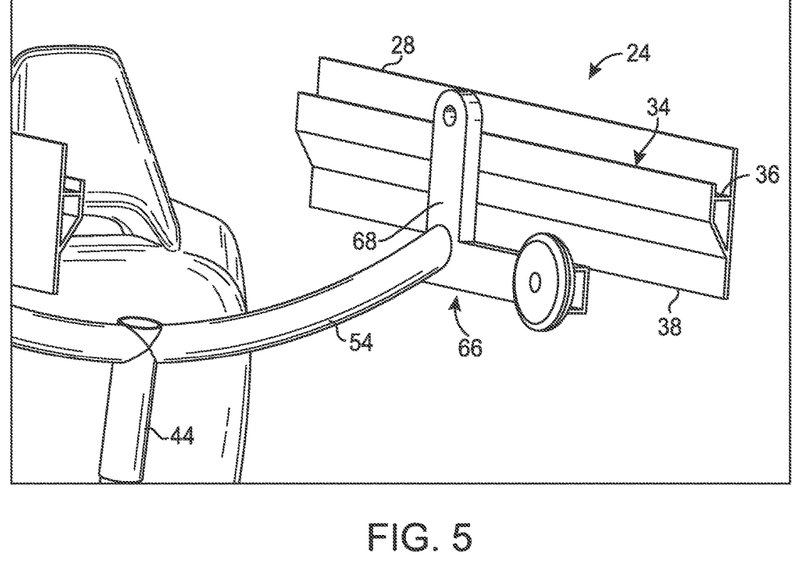
FIG. 5 is a perspective view of a portion of the exemplary system shown in FIG. 1.
Figure 6:
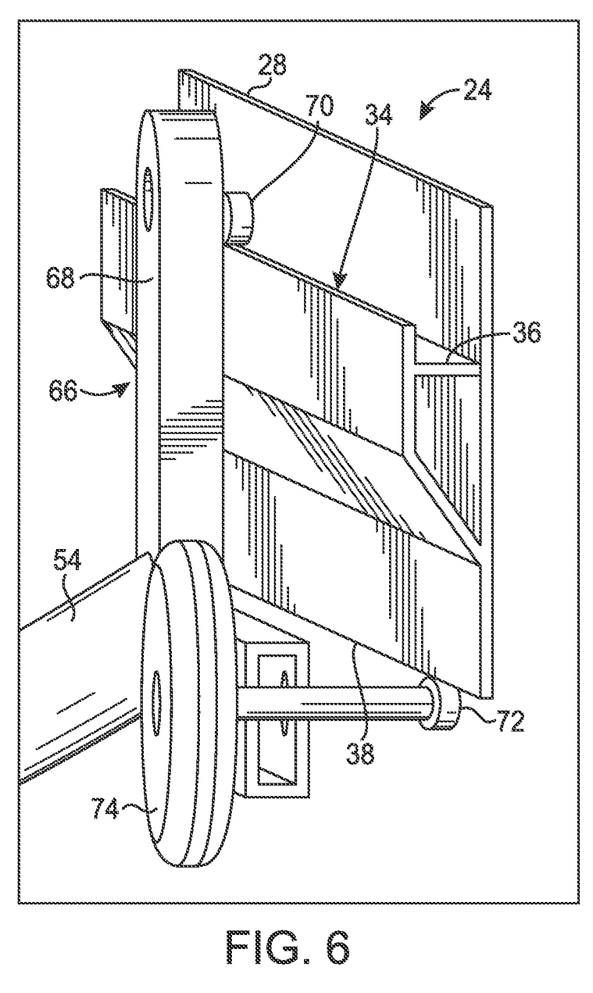
FIG. 6 is a perspective view of a portion of the exemplary system shown in FIG. 1.

Referring to FIGS. 1-10, an exemplary support system 20 is configured for suspending a user 21 from a lift, such as a lift 22, to allow user 21 to perform work, such as a wheel alignment, on a vehicle (not shown) supported on lift 22. As shown, for example, in FIGS. 2-6, lift 22 includes a frame 24 having parallel guide rails, namely, a first guide rail 26 and an opposing, parallel second guide rail 28 each extending along a longitudinal length of lift 22 between a first end 30 of frame 24 and a second end 32 of frame 24. Referring further to FIGS. 5 and 6, in one embodiment each of first guide rail 26 and second guide rail 28 has a first or top rolling surface 34 defining a slot or passage 36 configured for receiving a roller, as described in greater detail below. Additionally, each of first guide rail 26 and second guide rail 28 has a second or bottom rolling surface 38.

Figure 1:
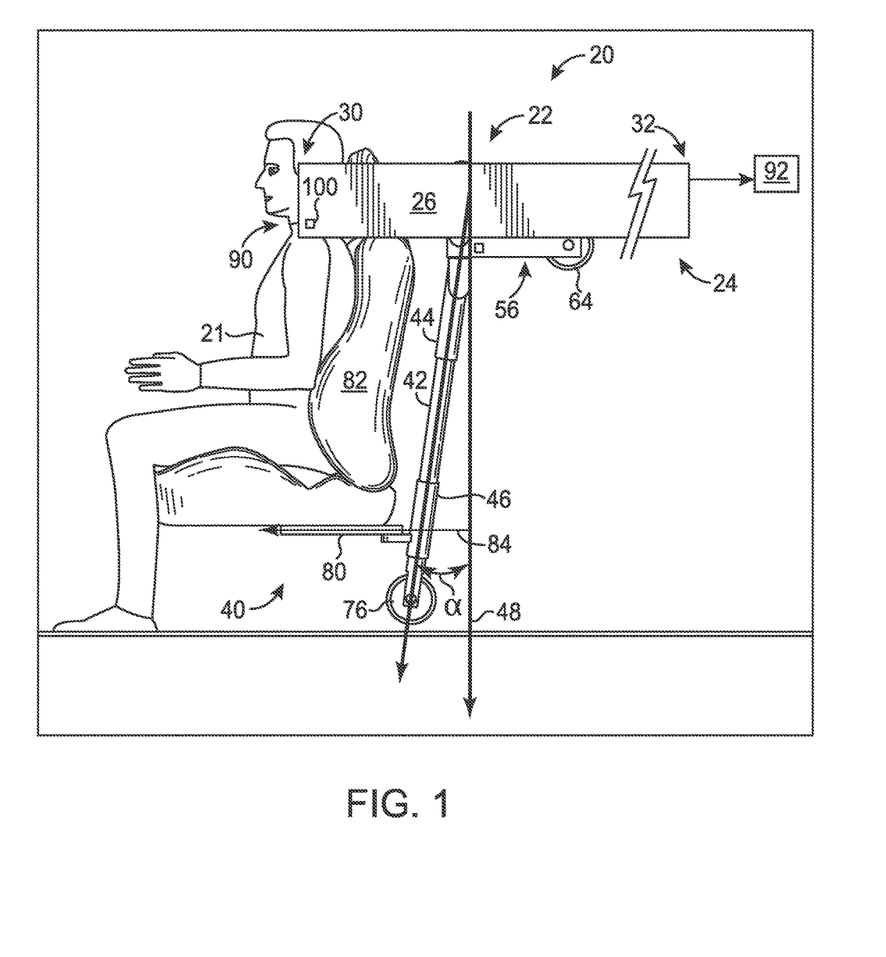
FIG. 1 is a side view of an exemplary system including an aligner chair movably coupled to a lift.

In one embodiment, support system 20 includes an aligner chair, such as a chair 40, operatively coupled to each of first guide rail 26 and second guide rail 28. Chair 40 is configured to move along guide rails 26, 28 between first end 30 of frame 24 and second end 32 of frame 24. Referring to FIGS. 1-4, chair 40 includes a support bar 42 having a first end 44 and an opposing second end 46. In one embodiment, as shown in FIG. 1, support bar 42 is positioned at angle α from a vertical reference line 48. In a particular embodiment, angle α is 10°, although in alternative embodiments, angle α may be greater than 10° or less than 10°. In one embodiment, support bar 42 is adjustable to adjust a length of support bar 42 to accommodate users of various heights, for example. As shown in FIG. 4, a transverse cross-member 50 is coupled to first end 44 of support bar 42. Transverse cross-member 50 has a lateral first side portion 52 and an opposing lateral second side portion 54. A first support assembly 56 is coupled to first side portion 52 and is configured to removably couple chair 40 to first guide rail 26.

Figure 8:
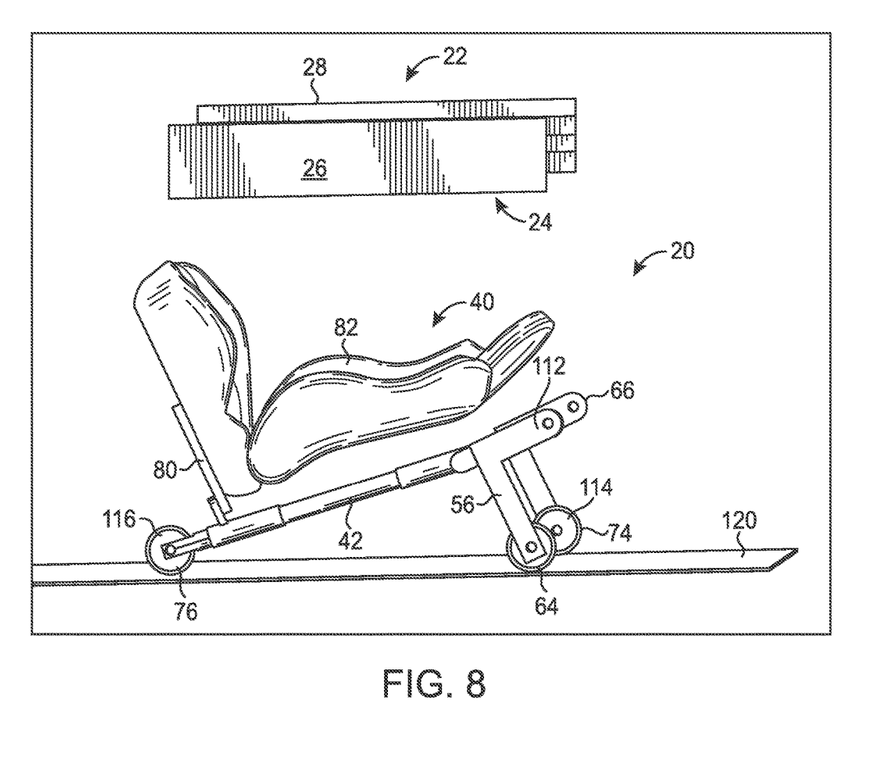
FIG. 8 is a perspective view of an exemplary aligner chair in a chair transport configuration.
Figure 9:
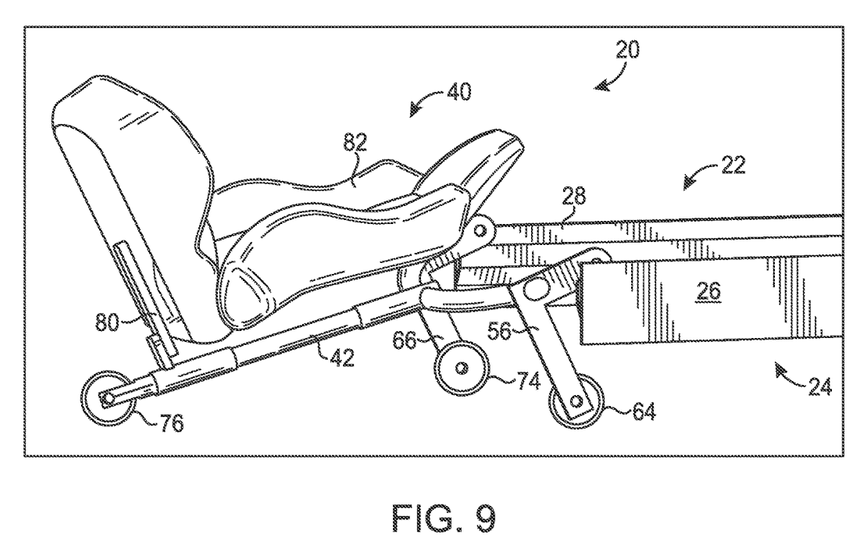
FIG. 9 is a perspective view of an exemplary aligner chair in the chair transport configuration positioned with respect to a lift system in a first intermediary position.

In one embodiment, first support assembly 56 includes a first support bracket 58 coupled to first side portion 52 of transverse cross-member 50. A first roller, such as an upper roller 60, is rotatably coupled to first support bracket 58. Upper roller 60 is configured to contact and move along top rolling surface 34 of first guide rail 26 and, in a particular embodiment, movably fit within passage 36 to facilitate moving chair 40 along a length of frame 22 while maintaining secure contact with first guide rail 26. A second roller, such as a lower roller 62, is also coupled to first support bracket 58. Lower roller 62 is configured to contact and move along bottom rolling surface 38 of first guide rail 26 to further facilitate moving chair 40 along a length of frame 22. As shown in FIG. 4, for example, a suitable wheel 64 is coupled to first support bracket 58. Wheel 64 is configured to contact a support surface, such as a floor surface, with chair 40 in a chair transport configuration, as shown in FIGS. 8 and 9, to facilitate moving chair 40 on the support surface.

Similarly, a second support assembly 66 is coupled to second side portion 54 of transverse cross-member 50 and is configured to removably couple chair 40 to second guide rail 28. Second support assembly 66 includes a second support bracket 68 coupled to second side portion 54 of transverse cross-member 50. A first roller, such as an upper roller 70, is rotatably coupled to second support bracket 68. Upper roller 70 is configured to contact and move along top rolling surface 34 of second guide rail 28 and, in a particular embodiment, movably fit within passage 36 to facilitate moving chair 40 along a length of frame 22 while maintaining secure contact with second guide rail 28. A second roller, such as a lower roller 72, is also coupled to second support bracket 68. Lower roller 72 is configured to contact and move along bottom rolling surface 38 of second guide rail 28 to further facilitate moving chair 40 along a length of frame 22. As shown in FIG. 4, for example, a suitable wheel 74, such as a wheel identical to wheel 64, is coupled to second support bracket 68. Wheel 74 is configured to contact the support surface with chair 40 in a chair transport configuration to facilitate moving chair 40 on the support surface. In one embodiment, a suitable wheel 76 is coupled to second end 46 of support bar 42 to facilitate moving chair 40 into alignment with lift 22 and a proper working position, as described in greater detail below, as well as to facilitate moving chair 40 on the support surface.

Figure 7:
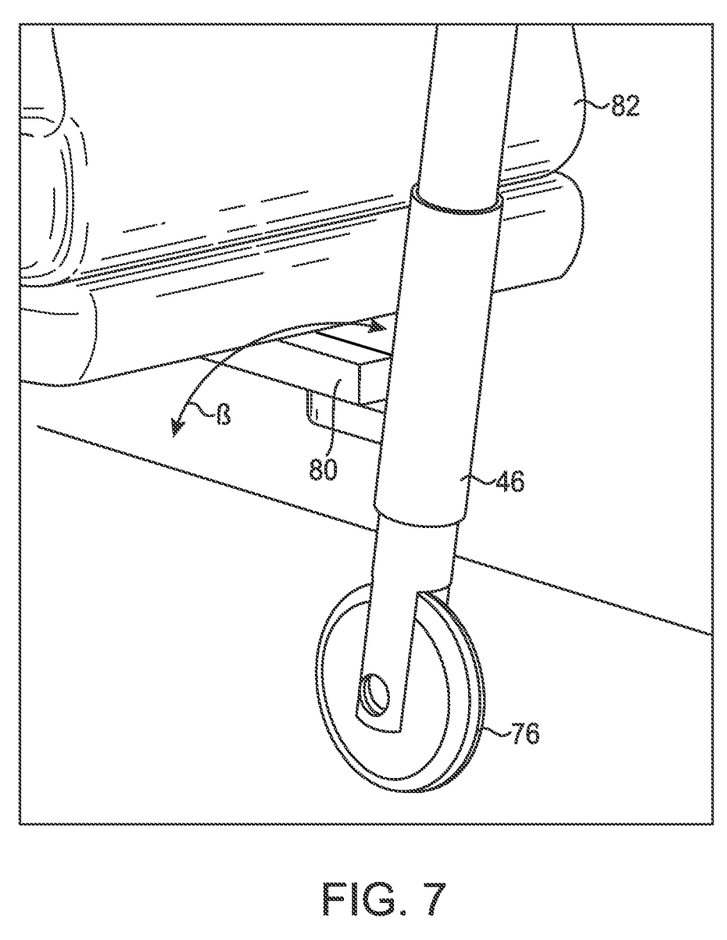
FIG. 7 is a perspective view of a portion of the exemplary system shown in FIG. 1.

As shown in FIG. 1, a seat support 80 is pivotally or rotatably coupled to second end 46 of support bar 42. Seat support 80 is configured to support a seat, such as a cushioned seat 82 including a suitable bottom support surface and a suitable lumbar support surface configured to support user 21 as user 21 performs the scheduled work on the vehicle supported on lift 22. In one embodiment, seat support 80 is configured to rotate with respect to support bar 40 within a first plane 84 through a suitable angle β as shown in FIG. 7, for example. Referring again to FIG. 1, in a particular embodiment, with chair 40 properly suspended from lift 22 as shown, first plane 84 is generally horizontal and perpendicular to vertical reference line 48.

Referring further to FIG. 1, support system 20 includes a sensing system 90 operatively coupled to lift 22 and chair 40. In one embodiment, sensing system 90 includes one or more suitable sensors configured to detect a chair full forward position, a chair transport configuration, a chair home position and a lift home position, for example as described herein. In the exemplary embodiment, sensing system 90 includes one or more sensors operatively coupled to one or more of the following components to detect axial, translational and/or rotational movement of the component: first end 30 of frame 24, second end 32 of frame 24, first support bracket 58, second support bracket 68, wheel 64, wheel 74, and/or wheel 76, for example. A controller 92 is in signal communication with the sensors of sensing system 90 and operational control communication with support system 20 and lift 22.

In one embodiment, controller 92 is configured to control operation of lift 22 based at least in part on signal communication with the sensors of sensing system 90. In some embodiments, controller 92 includes a processor platform implemented via one or more general-purpose processors, processor cores, microcontrollers, and/or one or more additional and/or alternative processing devices. In certain embodiments, the processor platform includes a programmable, general purpose processor. The processor executes coded instructions within a random access memory and/or a read-only memory. The coded instructions may include instructions executable to implement method 150 of FIG. 10 described below. The processor may be any type of processing device, such as a processor core, a processor and/or a microcontroller. The processor is in communication with the random access memory and the read-only memory via a communications bus. The random access memory may be implemented by any type of random access memory device such as, for example, DRAM, SDRAM, etc. The read-only memory may be implemented by any type of memory device such as, for example, flash memory. In some embodiments, the processor platform includes a memory controller to control access to the random access memory and/or the read-only memory. The processor platform includes an interface that may be implemented by an interface standard such as, for example, an external memory interface, a serial port, a general-purpose input/output, and/or any other type of interface standard. The processor platform includes at least one input device and at least one output device coupled to the interface.

Figure 2:
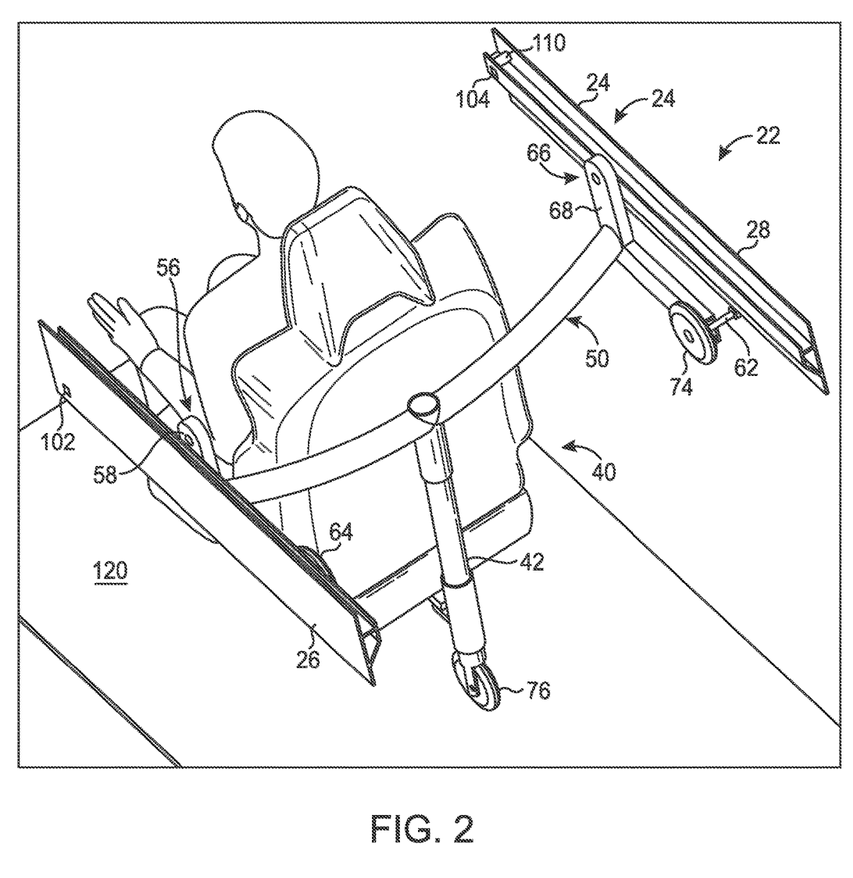
FIG. 2 is a top perspective view of the exemplary system shown in FIG. 1.
Figure 3:
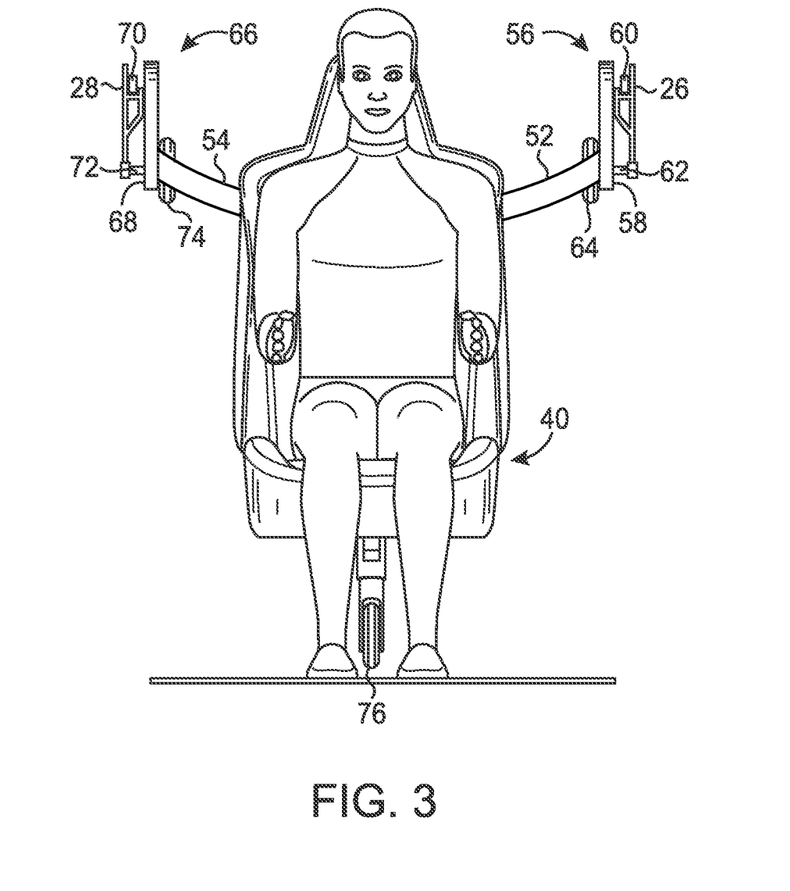
FIG. 3 is a front view of the exemplary system shown in FIG. 1.

For example, in one embodiment, a suitable position detection sensor 100, as shown in FIG. 1, is coupled to first end 30 of frame 24 to detect when chair 40 is positioned at first end 30 of frame 24 in a chair full forward position. Additionally or alternatively, a suitable detection sensor 102 is operatively coupled to first support bracket 58 and/or a suitable detection sensor 104 is operatively coupled to second support bracket 68 to facilitate detection of chair 40 at a location on first guide rail 26 and/or second guide rail 28, respectively, along a length of frame 24. In one embodiment, in the chair full forward position, chair 40 is positioned at first end 30 of frame 24 and controller 92 is configured to lower lift 22 with respect to the support surface. In this embodiment, controller 92 is also configured to prevent undesirable downward vertical movement of lift 22 if chair 40 is not in the chair full forward position. A mechanical stopper 110 or an electronic stopper (not shown) is positioned at first end 30 of frame 24 to prevent movement of chair 40 from the chair full forward position past stopper 110. As shown in FIG. 2, in one embodiment, stopper 110 is positioned on second guide rail 28 to prevent movement of second support bracket 68 on second guide rail 28 past stopper 110.

Referring further to FIGS. 8 and 9, in one embodiment, a suitable detection sensor 112 is operatively coupled to wheel 70 shown in FIG. 6. In one embodiment, with chair 40 in the chair transport configuration, controller 92 is configured to discontinue lowering lift 22 to facilitate removing chair 40 from first guide rail 26 and second guide rail 28. In this embodiment, controller 92 is also configured to prevent movement of lift 22 until chair 40 is removed from first guide rail 26 and second guide rail 28. With chair 40 removed from first guide rail 26 and second guide rail 28 and located in an aligner chair home base where sensing system 90 will detect detection sensor 112, controller 92 is configured to lower lift 22 to a lift home position.

Figure 10:
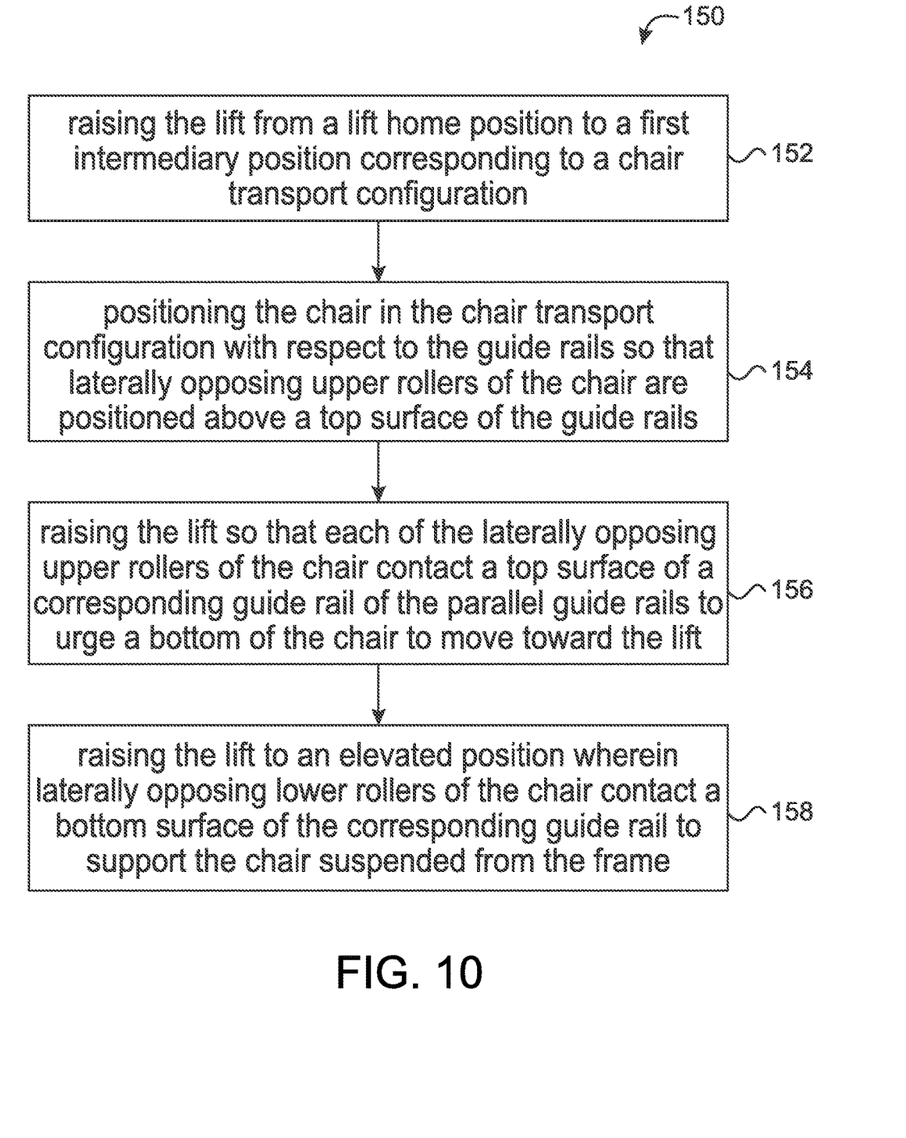
FIG. 10 depicts an exemplary method for suspending an aligner chair from a lift system.

FIG. 10 depicts an exemplary method for suspending a chair from a lift including a frame having parallel guide rails extending along a length of the lift. The method 150 of FIG. 10 may be implemented using a program for execution by one or more processors. However, the entire program and/or portions of the program could be executed by one or more additional and/or alternative devices. The program(s) may be stored on a tangible computer readable medium such as a CD-ROM, a hard drive, a flash drive, a digital versatile disk (DVD), or a memory employed by the processor(s). Further, although method 150 is described with reference to the flowchart of FIG. 10, other methods of implementing the embodiments disclosed herein may be used. For example, the order of the blocks may be different, and/or some of the blocks may be different, eliminated, or combined.

As mentioned above, the exemplary method 150 may be implemented using computer readable instructions stored on a tangible computer readable medium. As used herein, a tangible computer readable medium is not a propagating signal. Additionally or alternatively, method 150 may be implemented using computer readable instructions stored on a non-transitory computer readable medium such as a hard drive, a flash drive, a CD-ROM, and/or any other non-transitory storage media in which information is stored. As used herein, a non-transitory computer readable medium is not a propagating signal.

The method 150 begins with positioning or raising 152 the lift from a lift home position to a first intermediary position corresponding to a chair transport configuration. With the chair in the chair transport configuration as shown in FIG. 9, the chair is positioned, at block 154, with respect to the guide rails of the lift so that laterally opposing upper rollers of the chair are positioned above a top surface of the guide rails. At block 156, the lift is raised so that each of the laterally opposing upper rollers of the chair contact a top surface of a corresponding guide rail of the parallel guide rails. As the lift is raised with the upper rollers resting on the top rolling surface of the corresponding guide rails, a weight of the chair urges the chair to rotate with respect to the lift to urge a bottom of the chair to move toward the lift, e.g., to move underneath the elevated lift. The rotational movement of the chair toward the lift is facilitated by the wheel coupled to the bottom of the support bar. At block 158, the lift is raised to an elevated position. With the lift in the elevated position, the laterally opposing lower rollers of the chair contact a bottom surface of the corresponding guide rail to support the chair suspended from the frame. In one embodiment, with the chair in a chair full forward position, the lift can be lowered toward the support surface. Further, with the chair in the chair transport configuration, the chair can be removed from the guide rails.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments. As used herein, the word "exemplary" means serving as an example, instance, or illustration. Any aspect or embodiment described herein as "exemplary" is not necessarily to be construed as preferred or advantageous over other aspects or embodiments.

What is claimed is:

1. A chair configured to movably couple to parallel guide rails of a frame, the chair comprising:
    a support bar having a first end and an opposing second end, wherein the support bar is adjustable to adjust a length of the support bar;
    a transverse cross-member coupled to the first end of the support bar, the transverse cross-member having a first side portion and an opposing second side portion;
    a first support assembly coupled to the first side portion of the transverse cross-member, the first support assembly configured to removably couple to a first guide rail of the parallel guide rails; and
    a second support assembly coupled to the second side portion of the transverse cross-member, the second support assembly configured to removably couple to a second guide rail of the parallel guide rails, wherein the transverse cross-member extends transversely beyond a first side and a second side of the chair so that the chair is movably coupled within a space between the first guide rail and the second guide rail.

2. The chair of claim 1, wherein the first support assembly comprises:
    a first support bracket coupled to the first side portion of the transverse cross-member;
    a first roller coupled to the first support bracket, the first roller configured to movably contact a first surface of the first guide rail; and
    a second roller coupled to the first support bracket, the second roller configured to movably contact a second surface of the first guide rail.

3. The chair of claim 2, further comprising a wheel coupled to the first support bracket, the wheel configured to contact a support surface with the chair in a chair transport configuration to facilitate moving the chair on the support surface.

4. The chair of claim 2, wherein the second support assembly comprises:
    a second support bracket coupled to the second side portion of the transverse cross-member;
    a third roller coupled to the second support bracket, the third roller configured to movably contact a first surface of the second guide rail; and
    a fourth roller coupled to the second support bracket, the fourth roller configured to movably contact a second surface of the second guide rail.

5. The chair of claim 4, further comprising a wheel coupled to the second support bracket, the wheel configured to contact a support surface with the chair in a chair transport configuration to facilitate moving the chair on the support surface.

6. The chair of claim 1, further comprising a seat support rotatably coupled to the second end of the support bar.

7. The chair of claim 6, wherein the seat support is configured to rotate with respect to the support bar in a first plane.

8. The chair of claim 6, further comprising a seat coupled to the seat support.

9. The chair of claim 1, further comprising a wheel coupled to the second end of the support bar.

10. A support system for suspending a user from a lift, the lift having a frame including parallel guide rails extending along a length of the lift, the support system comprising:
    a chair operatively coupled to the guide rails, the chair configured to move along the guide rails between a first end of the frame and a second end of the frame;
    a sensing system operatively coupled to the lift and the chair, the sensing system including one or more sensors configured to detect a chair full forward position, a chair transport configuration, and a chair home position; and
    a controller in signal communication with the sensing system, the controller configured to control operation of the lift based at least in part on signal communication with the sensing system.

11. The support system of claim 10, wherein, with the chair in the chair transport configuration, the controller is configured to discontinue lowering the lift to facilitate removing the chair from the guide rails.

12. The support system of claim 11, wherein with the chair in the chair transport configuration, the controller is configured to prevent movement of the lift until the chair is removed from the guide rails.

13. The support system of claim 11, wherein, with the chair removed from the guide rails, the controller is configured to lower the lift to a lift home position.

14. The support system of claim 10, further comprising a stopper positioned at the first end of the frame to prevent movement of the chair from the chair full forward position past the stopper.

15. The support system of claim 10, wherein, in the chair full forward position, the chair is positioned at the first end of the frame, and the controller is configured to lower the lift with respect to the support surface.

16. The support system of claim 10, wherein the controller is configured to prevent vertical movement of the lift if the chair is not in the chair full forward position.

17. A method for suspending a chair from a lift, the lift including a frame having parallel guide rails extending along a length of the lift, said method comprising:
    raising the lift from a lift home position to a first intermediary position corresponding to a chair transport configuration;
    positioning the chair in the chair transport configuration with respect to the guide rails so that laterally opposing upper rollers of the chair are positioned above a top surface of the guide rails;
    raising the lift so that each of the laterally opposing upper rollers of the chair contacts a top surface of a corresponding guide rail of the parallel guide rails to urge a bottom of the chair to move toward the lift; and
    raising the lift to an elevated position wherein laterally opposing lower rollers of the chair contact a bottom surface of the corresponding guide rail to support the chair suspended from the frame.

18. The method of claim 17, further comprising, with the chair in the chair transport configuration, removing the chair from the guide rails.

19. The method of claim 17, further comprising, with the chair in a chair full forward position, lowering the lift with respect to a support surface.

\* \* \* \* \*